(12) United States Patent
Seki

(10) Patent No.: US 10,480,721 B2
(45) Date of Patent: Nov. 19, 2019

(54) LIGHT FLUX CONTROLLING MEMBER, LIGHT EMITTING DEVICE AND ILLUMINATING DEVICE

(71) Applicant: Enplas Corporation, Saitama (JP)

(72) Inventor: Akinobu Seki, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 155 days.

(21) Appl. No.: 15/579,259

(22) PCT Filed: Jun. 1, 2016

(86) PCT No.: PCT/JP2016/066217
§ 371 (c)(1),
(2) Date: Dec. 4, 2017

(87) PCT Pub. No.: WO2016/194959
PCT Pub. Date: Dec. 8, 2016

(65) Prior Publication Data
US 2018/0156393 A1    Jun. 7, 2018

(30) Foreign Application Priority Data
Jun. 3, 2015 (JP) .................. 2015-113054

(51) Int. Cl.
| F21K 9/232 | (2016.01) |
| F21K 9/69 | (2016.01) |
| G02B 5/02 | (2006.01) |
| F21V 5/04 | (2006.01) |
| F21V 7/00 | (2006.01) |
| G02B 19/00 | (2006.01) |
| F21Y 115/10 | (2016.01) |
| F21Y 103/33 | (2016.01) |
| F21K 9/68 | (2016.01) |

(Continued)

(52) U.S. Cl.
CPC ............ *F21K 9/232* (2016.08); *F21K 9/69* (2016.08); *F21V 5/00* (2013.01); *F21V 5/043* (2013.01);
(Continued)

(58) Field of Classification Search
None
See application file for complete search history.

(56) References Cited

U.S. PATENT DOCUMENTS 9,703,130 B2 * 7/2017 Jung .................. G02F 1/13306
9,971,197 B2 * 5/2018 Song .................. G02B 19/0071
(Continued)

FOREIGN PATENT DOCUMENTS

| JP | 2009-244316 A | 10/2009 |
| JP | 2012-209237 A | 10/2012 |

OTHER PUBLICATIONS

International Search Report from International Application No. PCT/JP2016/066217 dated Sep. 6, 2016.

*Primary Examiner* — Britt D Hanley
(74) *Attorney, Agent, or Firm* — Brundidge & Stanger, P.C.

(57) ABSTRACT

This luminous flux control member has an entry region, a first fully reflective surface, an exit surface, a second fully reflective surface, a third fully reflective surface, and a connection surface. Some of the light emitted by the light-emission element enters via the entry region, subsequently reflects off the first fully reflective surface, and exits from the exit surface. The remainder of the light emitted by the light-emission element enters via the entry region, reflects off the second fully reflective surface and the third fully reflective surface in the stated order, exits from the connection surface, enters again via the first fully reflective surface, and subsequently exits from the exit surface.

10 Claims, 10 Drawing Sheets

(51) Int. Cl.
*F21V 5/00* (2018.01)
*F21Y 105/16* (2016.01)

(52) U.S. Cl.
CPC ............ *F21V 5/045* (2013.01); *F21V 7/0091* (2013.01); *G02B 5/02* (2013.01); *G02B 19/0014* (2013.01); *G02B 19/0028* (2013.01); *G02B 19/0061* (2013.01); *F21K 9/68* (2016.08); *F21Y 2103/33* (2016.08); *F21Y 2105/16* (2016.08); *F21Y 2115/10* (2016.08)

(56) References Cited

U.S. PATENT DOCUMENTS

| | | | |
|---|---|---|---|
| 10,156,328 B2 * | 12/2018 | Xu | F21V 29/89 |
| 2008/0303757 A1 * | 12/2008 | Ohkawa | F21V 5/04 |
| | | | 345/82 |
| 2011/0096533 A1 * | 4/2011 | Sekela | A47F 3/001 |
| | | | 362/125 |
| 2011/0141734 A1 * | 6/2011 | Li | F21V 5/04 |
| | | | 362/235 |
| 2012/0307513 A1 * | 12/2012 | Li | G02B 6/0045 |
| | | | 362/555 |
| 2012/0314424 A1 * | 12/2012 | Ohkawa | G02B 19/0061 |
| | | | 362/327 |
| 2013/0343058 A1 * | 12/2013 | Yamaguchi | G02B 3/0037 |
| | | | 362/291 |
| 2014/0286018 A1 | 9/2014 | Zhang et al. | |
| 2015/0043213 A1 | 2/2015 | Zhang et al. | |
| 2015/0131265 A1 * | 5/2015 | Nakamura | G02F 1/0105 |
| | | | 362/97.1 |
| 2019/0024855 A1 * | 1/2019 | Mochida | F21S 2/005 |

\* cited by examiner

LIGHT FLUX CONTROLLING MEMBER, LIGHT EMITTING DEVICE AND ILLUMINATING DEVICE

TECHNICAL FIELD

The present invention relates to a light flux controlling member that controls a distribution of light emitted from a light-emitting element, and a light-emitting device and an illumination apparatus including the light flux controlling member.

BACKGROUND ART

In recent years, in view of energy saving and environmental conservation, illumination apparatuses (such as light-emitting diode lamps) using a light-emitting diode (hereinafter also referred to as "LED") as a light source have been increasingly used in place of incandescent lamps or fluorescent lamps. Conventional illumination apparatuses using LEDs as the light source, however, emit light only in the forward direction (the emission direction of light from the light source), and cannot emit light in a wide range unlike incandescent lamps or fluorescent lamps. Therefore, unlike incandescent lamps or fluorescent lamps, the conventional illumination apparatuses cannot illuminate a wide range of a room by utilizing the reflection light of the ceiling and walls.

To make the light distribution characteristics of the conventional illumination apparatuses using LEDs as the light source close to the light distribution characteristics of incandescent lamps or fluorescent lamps, it has been proposed to control the light distribution of light emitted from LEDs by a light flux controlling member (see, for example, PTLS 1 and 2). FIG. 1A to FIG. 1C illustrate a configuration of the light flux controlling member disclosed in PTLS 1 and 2. FIG. 1A is a perspective view of light flux controlling member 10 disclosed in PTL 1, and FIG. 1B illustrates light paths in light flux controlling member 10 disclosed in PTL 1. In addition, FIG. 1C illustrates light paths in light flux controlling member 50 disclosed in PTL 2.

As illustrated in FIG. 1A and FIG. 1B, light flux controlling member 10 disclosed in PTL 1 includes bottom surface 20, first side surface 30, and second side surface 40. Bottom surface 20 includes support surface 21 and incidence surface 22. In addition, incidence surface 22 includes first incidence surface 23, second incidence surface 24, and third incidence surface 25. First side surface 30 includes first projecting surface 31 and first reflecting surface 32. Second side surface 40 includes second projecting surface 41 and second reflecting surface 42. In light flux controlling member 10 disclosed in PTL 1, a part of light emitted from the light source is incident on first incidence surface 23 and emitted from first projecting surface 31. In addition, another part of the light emitted from the light source is incident on second incidence surface 24 and reflected by first reflecting surface 32, and, emitted from second projecting surface 41. Further, another part of the light emitted from the light source light is incident on third incidence surface 25 and then reflected by second reflecting surface 42 and first reflecting surface 32, and, emitted from second projecting surface 41.

As illustrated in FIG. 1C, light flux controlling member 50 disclosed in PTL 2 includes incidence surface 60, projecting surface 70, and total internal reflection surface 80. Incidence surface 60 includes first incidence surface 61 and second incidence surface 62. Projecting surface 70 includes first projecting surface 71 and second projecting surface 72. In light flux controlling member 50 disclosed in PTL 2, a part of light emitted from the light source is incident on first incidence surface 61 and emitted from first projecting surface 71. In addition, another part of the light emitted from the light source is incident on light second incidence surface 62, and then internally reflected by total internal reflection surface 80, and, emitted from second projecting surface 72.

By controlling the travelling direction of the light emitted from the light source with use of light flux controlling members 10 and 50, it is possible to obtain emission light not only in the forward direction but also in the lateral direction.

CITATION LIST

Patent Literature

PTL 1
US Patent Application Publication No. 2015/0043213
PTL 2
US Patent Application Publication No. 2014/0286018

SUMMARY OF INVENTION

Technical Problem

However, light flux controlling members 10 and 50 disclosed in PTLS 1 and 2 have a problem of imbalance in light distribution because the quantity of rearward light is small.

In view of this, an object of the present invention is to provide a light flux controlling member which can distribute light with a good balance in the forward, lateral and rearward directions in a manner similar to electric light bulbs or fluorescent lamps. In addition, another object of the present invention is to provide a light-emitting device and an illumination apparatus having the light flux controlling member.

Solution to Problem

A light flux controlling member according to embodiments of the present invention is configured to control a distribution of light emitted from a light-emitting element, the light flux controlling member including: an incidence region configured to face the light-emitting element; a first total reflection surface disposed on a side opposite to the incidence region; an emission surface disposed in one direction orthogonal to an optical axis of the light-emitting element; a second total reflection surface disposed on a side opposite to the emission surface in the one direction; a third total reflection surface disposed on a side opposite to the second total reflection surface in a direction along the optical axis; and a connection surface connecting the first total reflection surface and the third total reflection surface. A part of the light emitted from the light-emitting element enters the light flux controlling member from the incidence region so as to be reflected by the first total reflection surface before being emitted from the emission surface, and another part of the light emitted from the light-emitting element enters the light flux controlling member from the incidence region so as to be reflected by the second total reflection surface and the third total reflection surface in this order, and thereafter emitted from the connection surface so as to re-enter the light flux controlling member from the first total reflection surface before being emitted from the emission surface.

In addition, a light-emitting device according to embodiments of the present invention includes: a plurality of light-emitting elements; and the above-mentioned light flux controlling member, in which the light flux controlling member is disposed such that the incidence region faces the plurality of light-emitting elements.

In addition, an illumination apparatus according to embodiments of the present invention includes: the above-mentioned light-emitting device; and a cover configured to allow light emitted from the light-emitting device to pass therethrough while diffusing the light.

Advantageous Effects of Invention

With the light flux controlling member according to embodiments of the present invention, it is possible to make the light distribution characteristics of an illumination apparatus including a plurality of light-emitting devices close to the light distribution characteristics of incandescent lamps or fluorescent lamps.

DESCRIPTION OF EMBODIMENTS

In the following, embodiments of the present invention are described in detail with reference to the accompanying drawings.

Embodiment 1

In Embodiment 1, an illumination apparatus which can be used in place of incandescent lamps is described as a typical example of the illumination apparatus of the embodiment of the present invention.
(Configuration of Illumination Apparatus)

Figure 1A:
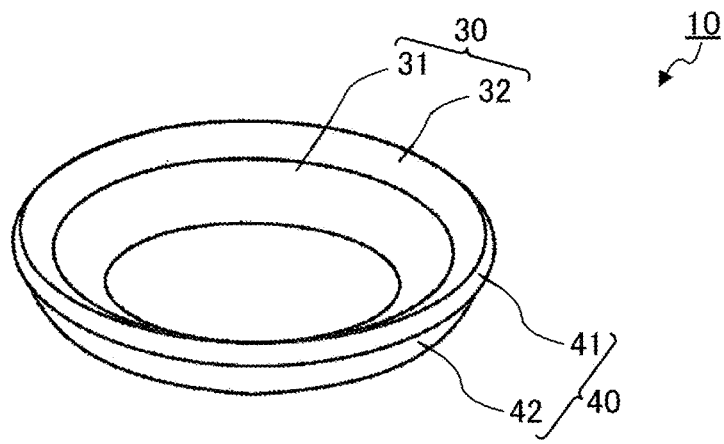
FIG. 1A to FIG. 1C are schematic views illustrating a configuration of light flux controlling members disclosed in PTLS 1 and 2.
Figure 1B:
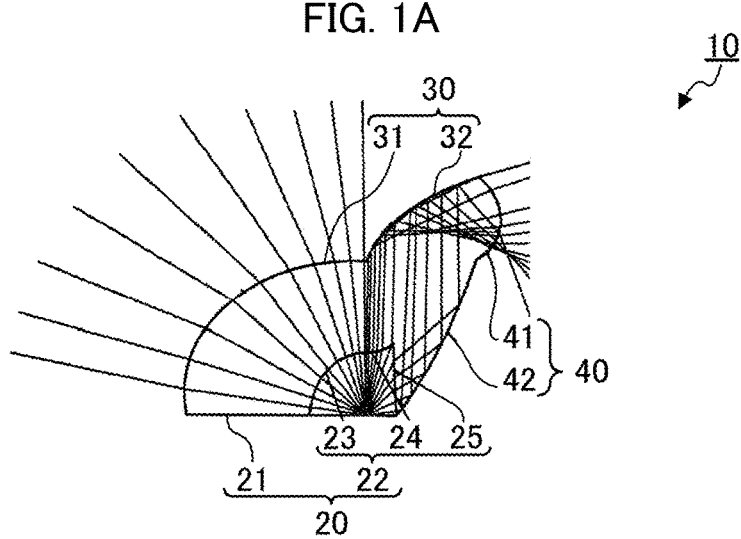
Figure 1C:
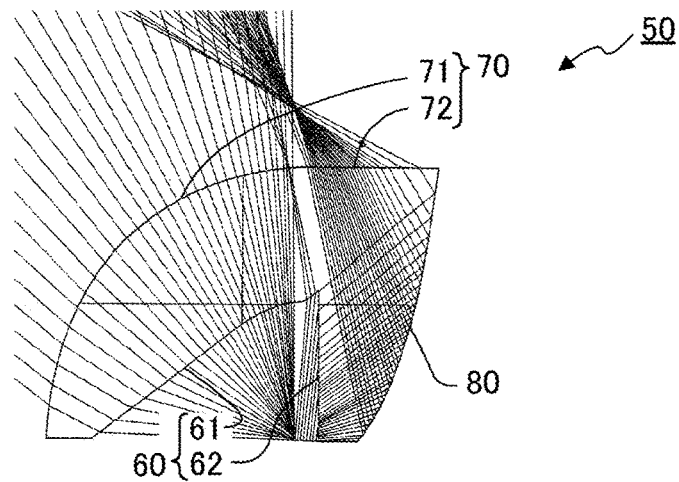
Figure 2A:
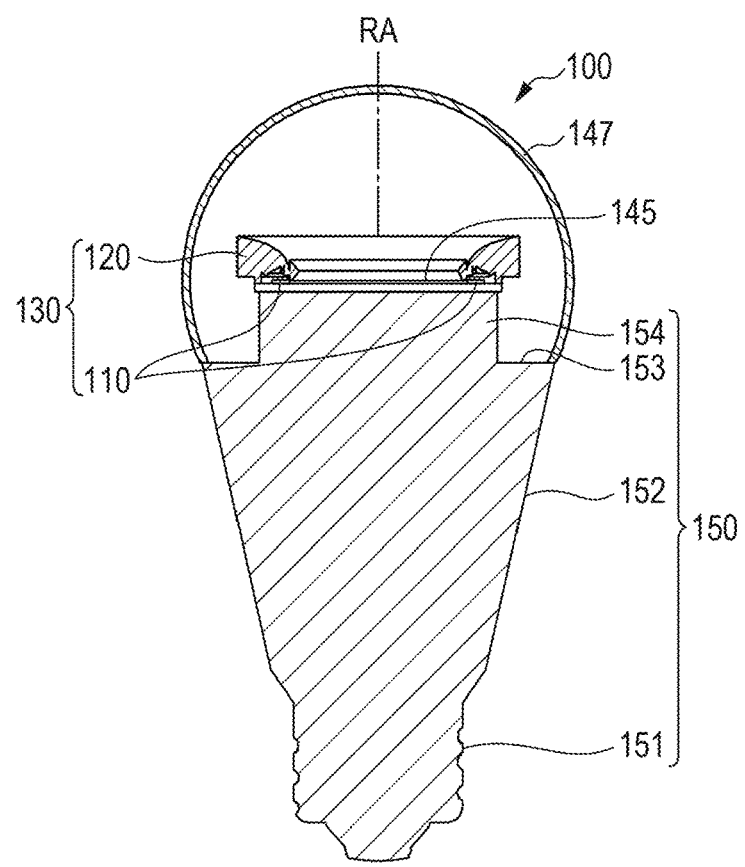
FIG. 2A and FIG. 2B illustrate an illumination apparatus according to Embodiment 1.
Figure 2B:
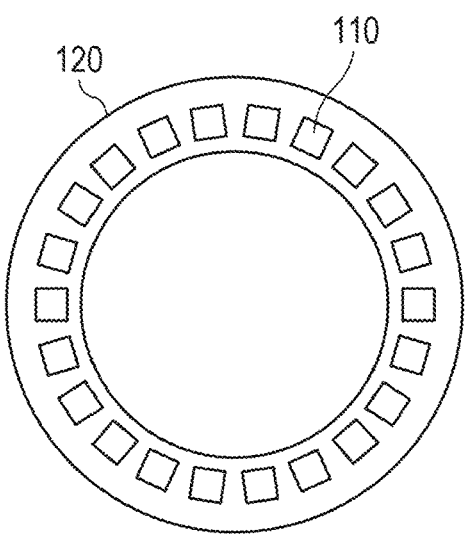

FIG. 2A and FIG. 2B illustrate a configuration of illumination apparatus 100 according to Embodiment 1 of the present invention. FIG. 2A is a sectional view of illumination apparatus 100, and FIG. 2B is a drawing (plan view) for describing a layout of light-emitting element 110. In FIG. 2A, the inner mechanism of casing 150 is omitted.

As illustrated in FIG. 2A and FIG. 2B, illumination apparatus 100 includes light-emitting device 130, substrate 145, cover 147, and casing 150. Light-emitting device 130 includes light-emitting element 110 and light flux controlling member 120.

Light-emitting element 110 is a light source of illumination apparatus 100, and is mounted on casing 150. For example, light-emitting element 110 is a light-emitting diode (LED) such as a white light-emitting diode. The number of light-emitting elements 110 is not limited as long as a plurality of light-emitting elements 110 are provided. In the present embodiment, the number of light-emitting elements 110 is twenty two. In addition, light-emitting elements 110 are disposed in a circumferential direction at even intervals. Each light-emitting element 110 is disposed such that optical axis OA thereof intersects light flux controlling member 120 (see FIG. 4). Here, the "optical axis of light-emitting element" is the travelling direction of light which is emitted from the center of the light-emitting surface of light-emitting element 110 so as to advance in a direction along the normal to the light-emitting surface. Accordingly, in the present embodiment, the number of optical axes OA of light-emitting elements 110 is twenty two. In the following description, the emission direction of light emitted from light-emitting element 110 along optical axis OA is the forward direction, and the direction opposite to the forward direction is the rearward direction.

Light flux controlling member 120 controls the distribution of the light emitted from light-emitting element 110. Light flux controlling member 120 has an annular shape, and is disposed on casing 150 so as to intersect optical axes OA of light-emitting elements 110. The shape of light flux controlling member 120 is rotationally symmetrical about rotation axis RA. Rotation axis RA is parallel to optical axes OA of light-emitting elements 110. One of the features of the present invention is the shape of light flux controlling member 120, and therefore the details of light flux controlling member 120 are described later.

Substrate 145 supports light-emitting element 110 and light flux controlling member 120. Substrate 145 is disposed on casing 150 (protruding part 154). Substrate 145 is made of, for example, a metal having a high thermal conductivity such as aluminum and copper. When substrate 145 is not need to have high thermal conductivity, substrate 145 may be composed of a resin substrate of glass nonwoven fabric impregnated with epoxy resin.

Cover 147 covers light flux controlling member 120, and allows light emitted from light flux controlling member 120 to pass therethrough while diffusing the light. Cover 147 has a light transmitting property. Cover 147 includes a hollow region including an opening. Light-emitting device 130 is disposed in the hollow region of cover 147. Examples of the material of cover 147 include translucent resins such as polymethylmethacrylate (PMMA), polycarbonate (PC), and epoxy resin (EP); and glass. Cover 147 also has a light diffusing property. The way of giving the light diffusion function to cover 147 is not limited. For example, a light diffusion process (for example, roughening process) may be performed on the inner surface or the outer surface of cover 147 produced with a transparent material, or a light diffusing material containing a scattering member such as beads may be added to the above-mentioned transparent material to produce cover 147.

Preferably, cover 147 includes a shape that is rotationally symmetrical about rotation axis RA of light flux controlling member 120. Cover 147 may have a shape which is composed only of a rotationally symmetrical shape, or a shape which includes a part of a rotationally symmetrical shape, for example. Preferably, cover 147 has a shape which can further improve the light distribution balance of light emitted from light flux controlling member 120. For example, preferably, cover 147 has a shape in which the diameter of the opening of cover 147 is smaller than the maximum outer diameter of cover 147 in view of increasing the quantity of the light toward the rearward direction. For example, the shape of cover 147 may be a spherical cap shape (a shape obtained by cutting out a part of a sphere along a plane).

Casing 150 supports light-emitting element 110, light flux controlling member 120, cover 147 and substrate 145 at the front of end portion of casing 150. Casing 150 is substantially rotationally symmetrical about rotation axis RA of light flux controlling member 120. Casing 150 includes base 151, tapered surface 152, annular end surface 153, and protruding part 154. Tapered surface 152 is disposed on the front side of base 151, and the distance of tapered surface 152 from rotation axis RA gradually increases toward the forward direction. Annular end surface 153 is composed of an annular plane that is formed on the inside of the front end edge of tapered surface 152 in a direction perpendicular to rotation axis RA. Protruding part 154 has a columnar shape protruding forward from the inner peripheral edge of annular end surface 153.

Light-emitting elements 110 are mounted on the circular front end surface of protruding part 154. Annular end surface 153 is in contact with the opening of cover 147. The outer diameter of annular end surface 153 is substantially equal to the outer diameter of the opening of cover 147. Annular end surface 153 is a seat that makes contact with the opening of cover 147.

In a portion surrounded by tapered surface 152 of casing 150, a power supply circuit that electrically connects base 151 and light-emitting element 110 is arranged. In addition, casing 150 serves also as a heat sink for emitting the heat of light-emitting element 110. In view of this, casing 150 is preferably composed of a metal having high thermal conductivity such as aluminum and copper.

The light emitted from light-emitting element 110 is controlled by light flux controlling member 120 such that the light travels toward all directions. The light emitted from light flux controlling member 120 passes through cover 147 while being diffused.

(Configuration of Light Flux Controlling Member)

Figure 3A:
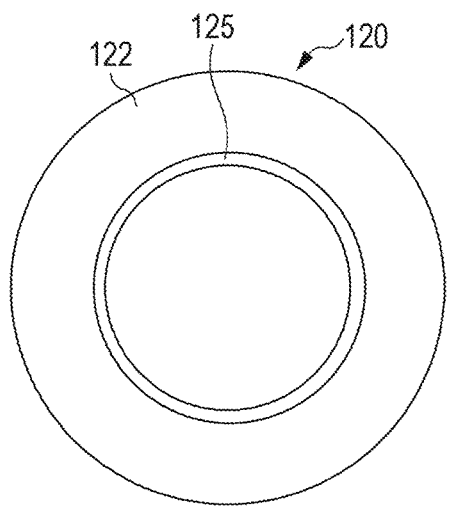
FIG. 3A to FIG. 3D illustrate a configuration of a light flux controlling member according to Embodiment 1.
Figure 3C:
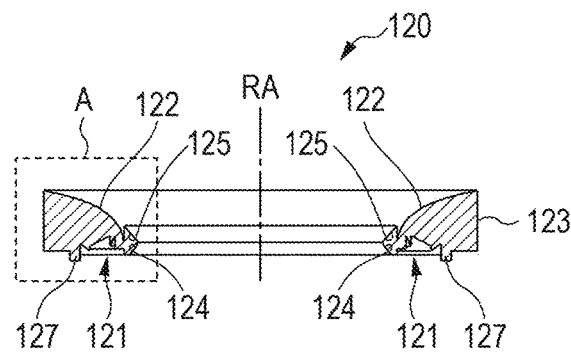
Figure 3B:
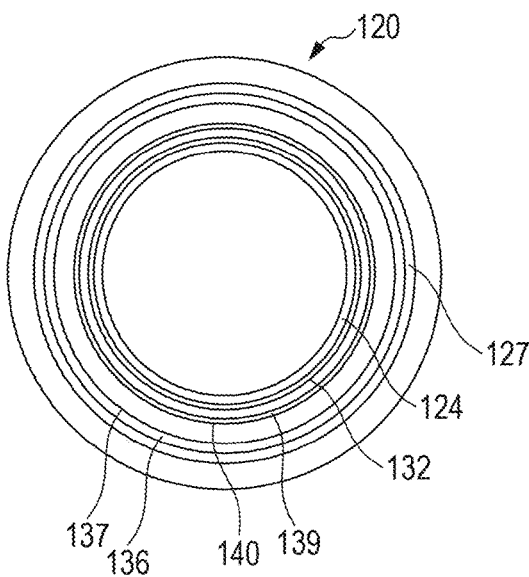
Figure 3D:
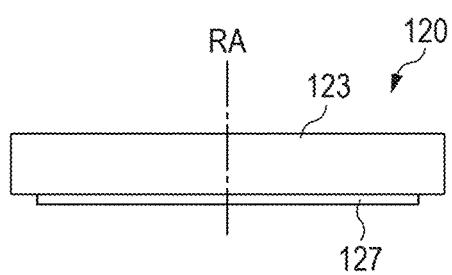
Figure 4:
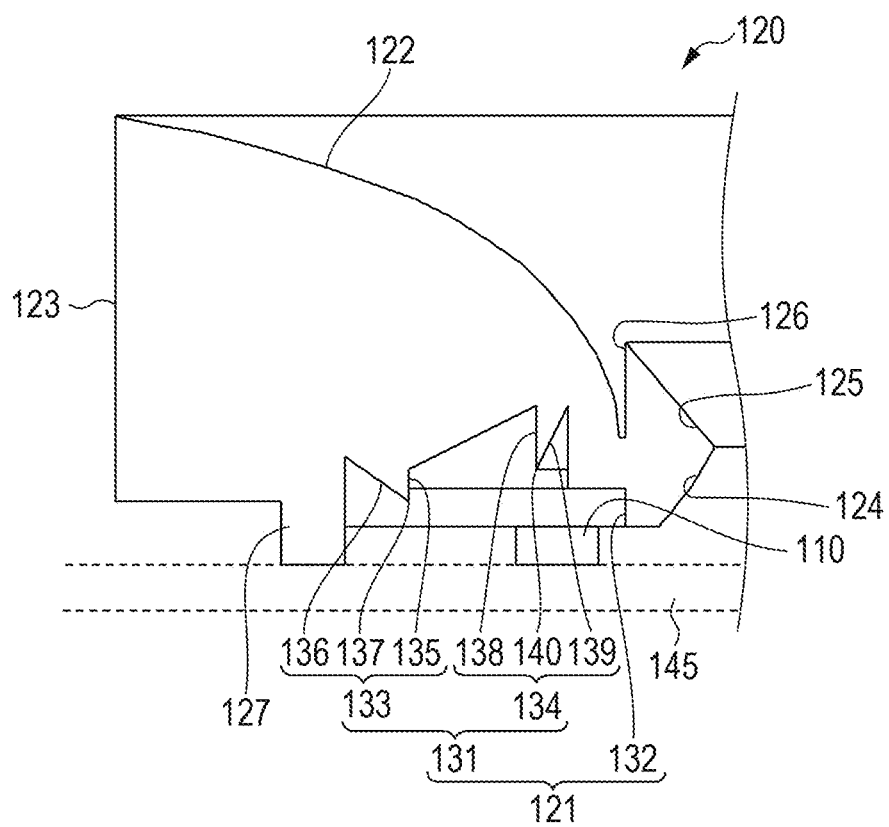
FIG. 4 is an enlarged view of region A illustrated in FIG. 3C.

Now light flux controlling member 120 is described in detail. FIG. 3A to FIG. 4 illustrate a configuration of light flux controlling member 120. FIG. 3A is a plan view of light flux controlling member 120, and FIG. 3B is a bottom view of light flux controlling member 120. FIG. 3C is a sectional view of light flux controlling member 120, and FIG. 3D is a side view of light flux controlling member 120. FIG. 4 is an enlarged view of region A of FIG. 3C. It is to be noted that hatching is omitted in FIG. 4.

As illustrated in FIG. 3A to FIG. 4, light flux controlling member 120 includes incidence region 121, first total reflection surface 122, emission surface 123, second total reflection surface 124, third total reflection surface 125, and connection surface 126. In addition, in the present embodiment, light flux controlling member 120 includes leg part 127 for fixing light flux controlling member 120 to substrate 145 and defining a gap for outward dissipation of the heat emitted from light-emitting element 110. As described above, light flux controlling member 120 has an annular shape, and is rotationally symmetrical about rotation axis RA. That is, each of incidence region 121, first total reflection surface 122, emission surface 123, second total reflection surface 124, third total reflection surface 125 and connection surface 126 is a rotationally symmetrical annular surface. Rotation axis RA of light flux controlling member 120 is disposed along optical axis OA of each light-emitting element 110. To be more specific, rotation axis RA is an axis along optical axes OA, which is disposed on second total reflection surface 124 side and third total reflection surface 125 side relative to optical axes OA of light-emitting elements 110, and is distanced from optical axes OA in comparison with second total reflection surface 124 and third total reflection surface 125.

Incidence region 121 is disposed to face light-emitting element 110. Incidence region 121 allows at least a part of light emitted from light-emitting element 110 to enter light flux controlling member 120. The shape of incidence region 121 is not limited. Incidence region 121 may be composed of a plane surface or a curved surface, or may be composed of a plurality of surfaces. In the present embodiment, incidence region 121 includes first incidence surface 131 including a plurality of surfaces, and second incidence surface 132.

First incidence surface 131 is disposed to face light-emitting element 110. The shape of first incidence surface 131 is not limited. First incidence surface 131 may be composed of a plane surface or a curved surface, or may include a plurality of surfaces. In the present embodiment, first incidence surface 131 includes a plurality of surfaces, and includes first protrusion 133, and second protrusion 134.

First protrusion 133 is disposed between optical axis OA of each light-emitting element 110 and emission surface 123. First protrusion 133 allows incidence of a part of light which is emitted from light-emitting element 110 and travels toward emission surface 123 side, so as to reflect the light toward first total reflection surface 122. First protrusion 133 includes first inner inclined surface 135, first outer inclined surface 136, and first ridgeline 137. First inner inclined surface 135 is disposed on rotation axis RA side. First outer inclined surface 136 is disposed at a position distanced from rotation axis RA in comparison with first inner inclined surface 135. Each of first inner inclined surface 135 and first outer inclined surface 136 may be composed of one surface, or may include a plurality of surfaces. In the present embodiment, each of first inner inclined surface 135 and first outer inclined surface 136 is composed of one surface. First ridgeline 137 is formed at the boundary of first inner inclined surface 135 and first outer inclined surface 136.

First inner inclined surface 135 refracts, toward first outer inclined surface 136, a part of light emitted from light-emitting element 110. The shape of first inner inclined surface 135 in the cross section including rotation axis RA is not limited. The shape of first inner inclined surface 135 in the cross section including rotation axis RA may be a straight line, or a curve. In the present embodiment, the shape of first inner inclined surface 135 in the cross section including rotation axis RA is a straight line. The inclination angle of first inner inclined surface 135 with respect to rotation axis RA in the cross section including rotation axis RA is not limited as long as the above-described function can be ensured. In the present embodiment, the inclination angle of first inner inclined surface 135 with respect to rotation axis RA is 0°. That is, in the present embodiment, first inner inclined surface 135 is disposed in a direction along rotation axis RA (optical axes OA of light-emitting elements 110).

First outer inclined surface 136 reflects, toward first total reflection surface 122, the light incident on first inner inclined surface 135. The shape of first outer inclined surface 136 in the cross section including rotation axis RA is not limited. The shape of first outer inclined surface 136 in the cross section including rotation axis RA may be a straight line, or a curve. In the present embodiment, the shape of first outer inclined surface 136 in the cross section including rotation axis RA is a straight line. The inclination angle of first outer inclined surface 136 with respect to rotation axis RA (the angle between first outer inclined surface 136 and a line that passes through the end of first outer inclined surface 136 on light-emitting element 110 side and is parallel to rotation axis RA) in the cross section including rotation axis RA is not limited as long as the above-described function can be ensured. In the present embodiment, the inclination angle of first outer inclined surface 136 is 55°. In addition, in the cross section including rotation axis RA, first outer inclined surface 136 is formed such that as the distance thereof from substrate 145 increases, the distance thereof from rotation axis RA increases.

In one direction orthogonal to optical axes OA of each light-emitting elements 110 (more specifically, in the direction orthogonal to rotation axis RA), second protrusion 134 is disposed on second incidence surface 132 side (rotation axis RA side) relative to first protrusion 133. Mainly, second protrusion 134 allows incidence of a part of light emitted from an end portion of light-emitting element 110 on emission surface 123 side so as to reflect the light toward first total reflection surface 122. Second protrusion 134 includes second outer inclined surface 138, second inner inclined surface 139, and second ridgeline 140. Second inner inclined surface 139 is disposed on rotation axis RA side. Second outer inclined surface 138 is disposed at a position distanced from rotation axis RA in comparison with second inner inclined surface 139. Each of second outer inclined surface 138 and second inner inclined surface 139 may be composed of one surface, or may include a plurality of surfaces. In the present embodiment, each of second outer inclined surface 138 and second inner inclined surface 139 is composed of one surface. Second ridgeline 140 is formed at the boundary of second outer inclined surface 138 and second inner inclined surface 139.

Second outer inclined surface 138 refracts, toward second inner inclined surface 139, a part of light emitted from light-emitting element 110. The shape of second outer inclined surface 138 in the cross section including rotation axis RA is not limited. The shape of second outer inclined surface 138 in the cross section including rotation axis RA may be a straight line, or a curve. In the present embodiment, the shape of second outer inclined surface 138 in the cross section including rotation axis RA is a straight line. In the present embodiment, the inclination angle of second outer inclined surface 138 with respect to rotation axis RA is 0°. That is, second outer inclined surface 138 is disposed in a direction along rotation axis RA (optical axes OA of light-emitting elements 110).

Second inner inclined surface 139 reflects, toward first total reflection surface 122, the light incident on second outer inclined surface 138. The shape of second inner inclined surface 139 in the cross section including rotation axis RA is not limited. The shape of second inner inclined surface 139 in the cross section including rotation axis RA may be a straight line, or a curve. In the present embodiment, the shape of second inner inclined surface 139 in the cross section including rotation axis RA is a straight line. The inclination angle of second inner inclined surface 139 with respect to rotation axis RA (the angle between second inner inclined surface 139 and a line that passes through an end of second inner inclined surface 139 on light-emitting element 110 side and is parallel to rotation axis RA) in the cross section including rotation axis RA is not limited as long as the above-described function can be ensured. In the present embodiment, the inclination angle of second inner inclined surface 139 is 26.6°. In addition, in the cross section including rotation axis RA, second inner inclined surface 139 is formed such that as the distance thereof from substrate 145 increases, the distance thereof to rotation axis RA decreases.

The shape of the region between first protrusion 133 and second protrusion 134 in the cross section including rotation axis RA may be a straight line, or a curve. In the present embodiment, the shape of the region is a straight line. To be more specific, in the present embodiment, the shape of the region between first protrusion 133 and second protrusion 134 in the cross section including rotation axis RA is formed such that as the distance thereof from substrate 145 increases, the distance thereof to rotation axis RA decreases.

In one direction orthogonal to optical axis OA of each light-emitting element 110 (more specifically, the direction orthogonal to rotation axis RA), second incidence surface 132 is disposed on second total reflection surface 124 side (rotation axis RA side) relative to first incidence surface 131. Second incidence surface 132 allows incidence of light emitted from light-emitting element 110 which advances toward light second total reflection surface 124 side (rotation axis RA side). The shape of second incidence surface 132 is not limited. The shape of second incidence surface 132 in the cross section including rotation axis RA may be a straight line, or a curve. In the present embodiment, the shape of second incidence surface 132 in the cross section including rotation axis RA is a straight line. In addition, the inclination angle of second incidence surface 132 with respect to rotation axis RA in the cross section including rotation axis RA is not limited. In the present embodiment, the inclination angle of second incidence surface 132 with respect to rotation axis RA in the cross section including rotation axis RA is 0°. That is, in the cross section including rotation axis RA, second incidence surface 132 is disposed along rotation axis RA. In addition, in view of releasing in injection molding, second incidence surface 132 may be tilted in the cross section including rotation axis RA such that as the distance thereof from substrate 145 increases, the distance thereof from rotation axis RA increases.

First total reflection surface 122 is disposed on the side opposite to incidence region 121. First total reflection surface 122 totally reflects a part of light incident on incidence region 121 toward light emission surface 123 in a direction away from rotation axis RA. In the cross section including rotation axis RA, first total reflection surface 122 is formed such that as the distance thereof from rotation axis RA increases (in one direction), the inclination of the tangent thereto decreases.

Emission surface 123 is disposed in one direction orthogonal to optical axis OA of light-emitting element 110 (more specifically, in a direction away from rotation axis RA). To be more specific, with respect to rotation axis RA, emission surface 123 is disposed at the outermost position in light flux controlling member 120. Emission surface 123 emits, to the outside, light having advanced inside light flux controlling member 120. Emission surface 123 may be composed of one surface, or may include a plurality of surfaces. In the present embodiment, emission surface 123 is composed of one surface. The shape of emission surface 123 in the cross section including rotation axis RA is not limited. The shape of emission surface 123 in the cross section including rotation axis RA may be a straight line, or a curve. In the present embodiment, the shape of emission surface 123 in the cross section including rotation axis RA is a straight line. In addition, the inclination angle of emission surface 123 with respect to rotation axis RA in the cross section including rotation axis RA is not limited. In the present embodiment, inclination angle of emission surface 123 with respect to rotation axis RA in the cross section including rotation axis RA is 0°. That is, emission surface 123 is disposed in a direction along rotation axis RA (optical axes OA of light-emitting elements 110).

In one direction orthogonal to optical axis OA of light-emitting elements 110 (more specifically, the direction orthogonal to rotation axis RA), second total reflection surface 124 is disposed on the side opposite to emission surface 123. In other words, second total reflection surface 124 is disposed between rotation axis RA and emission surface 123. Second total reflection surface 124 may be composed of one surface, or may include a plurality of surfaces. In the present embodiment, second total reflection surface 124 is composed of one surface. The shape of second total reflection surface 124 in the cross section including rotation axis RA is not limited. The shape of second total reflection surface 124 in the cross section including rotation axis RA may be a straight line, or a curve. In the present embodiment, the shape of second total reflection surface 124 in the cross section including rotation axis RA is a curve. In the cross section including rotation axis RA, second total reflection surface 124 is formed such that as the distance thereof from rotation axis RA increases, the distance thereof to substrate 145 decreases. In other words, second total reflection surface 124 is formed such that as the distance thereof to third total reflection surface 125 decreases, the distance thereof from emission surface 123 increases. In addition, in the cross section including rotation axis RA, second total reflection surface 124 is formed such that as the distance thereof from rotation axis RA increases, the inclination of the tangent thereto decreases (so as to be paralleled to a line orthogonal to rotation axis RA).

In the direction along optical axis OA of each light-emitting element 110, third total reflection surface 125 is disposed on the side opposite to second total reflection surface 124. Third total reflection surface 125 may be composed of one surface, or may include a plurality of surfaces. In the present embodiment, third total reflection surface 125 is composed of one surface. The shape of third total reflection surface 125 in the cross section including rotation axis RA is not limited. The shape of third total reflection surface 125 in the cross section including rotation axis RA may be a straight line, or a curve. In the present embodiment, the shape of third total reflection surface 125 in the cross section including rotation axis RA is a straight line. In the cross section including rotation axis RA, third total reflection surface 125 is formed such that as the distance thereof from rotation axis RA increases, the distance thereof from substrate 145 increases. In other words, third total reflection surface 125 is formed such that as the distance thereof from second total reflection surface 124 decreases, the distance thereof from emission surface 123 increases.

In addition, in the present embodiment, third total reflection surface 125 is connected with second total reflection surface 124. Further, in one direction orthogonal to optical axis OA of each light-emitting element 110 (more specifically, the direction orthogonal to rotation axis RA), third total reflection surface 125 partially overlaps first total reflection surface 122. As viewed along a direction orthogonal to optical axis OA (rotation axis RA) in the cross section including optical axis OA, connection surface 126 is disposed at a portion where third total reflection surface 125 and first total reflection surface 122 overlap each other. In this manner, in the direction along optical axis OA, the end portion of third total reflection surface 125 on the side opposite to substrate 145 is disposed forward of the end portion of first total reflection surface 122 on substrate 145 side in light flux controlling member 120, and thus downsizing (thinning) can be achieved.

Further, in the cross section including rotation axis RA, it is preferable that the inclination of the tangent to the end portion of third total reflection surface 125 on the side opposite to substrate 145 be smaller than the inclination of the tangent to the end portion of first total reflection surface 122 on the side close to substrate 145, in view of appropriately reflecting light incident on first incidence surface 131 toward emission surface 123 (or, in view of reducing the quantity of light which passes through first total reflection surface 122).

Connection surface 126 connects first total reflection surface 122 and third total reflection surface 125. Connection surface 126 may be composed of one surface, or a plurality of surfaces. In the present embodiment, connection surface 126 is composed of one surface. In addition, the shape of connection surface 126 in the cross section including rotation axis RA is not limited. The shape of connection surface 126 in the cross section including rotation axis RA may be a straight line, or a curve. In the present embodiment, the shape of connection surface 126 in the cross section including rotation axis RA is a straight line. The inclination angle of connection surface 126 with respect to rotation axis RA in the cross section including rotation axis RA is not limited. In the present embodiment, the inclination angle of connection surface 126 with respect to rotation axis RA is 0°. That is, in the present embodiment, connection surface 126 is disposed in a direction along rotation axis RA.

(Light Path in Light Flux Controlling Member)

Figure 5:
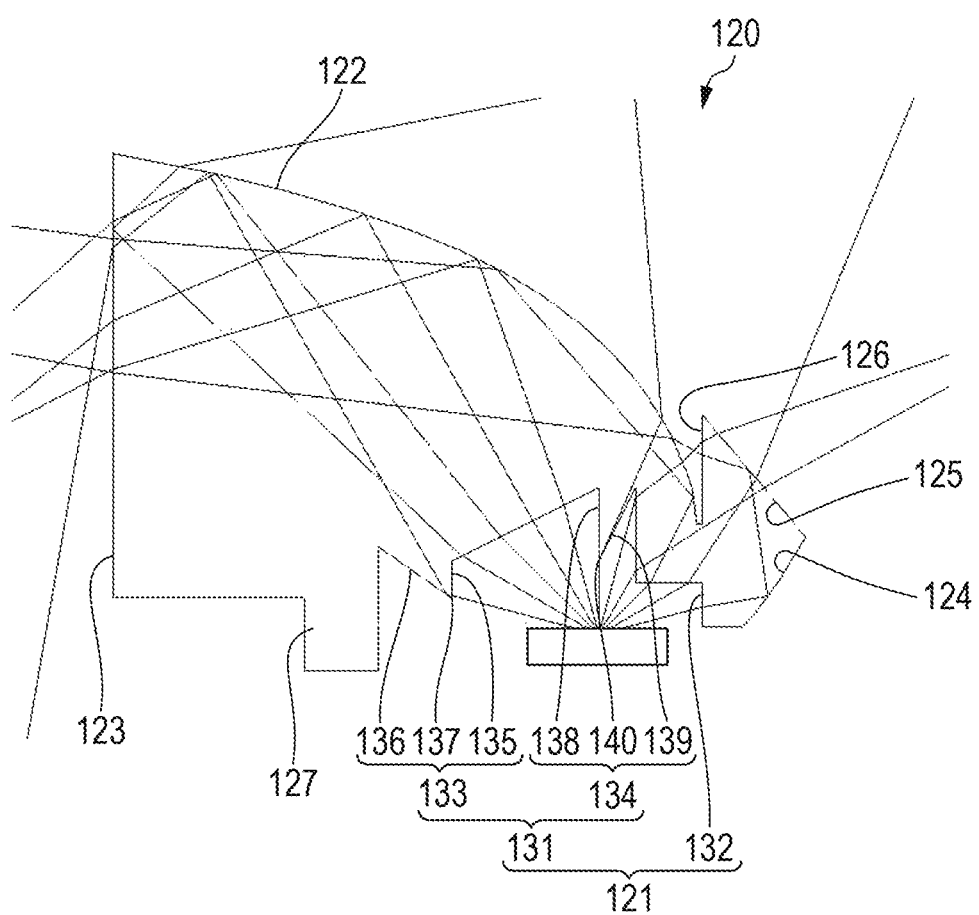
FIG. 5 illustrates light paths of light emitted from a center of a light-emitting element of the light flux controlling member according to Embodiment 1.
Figure 6:
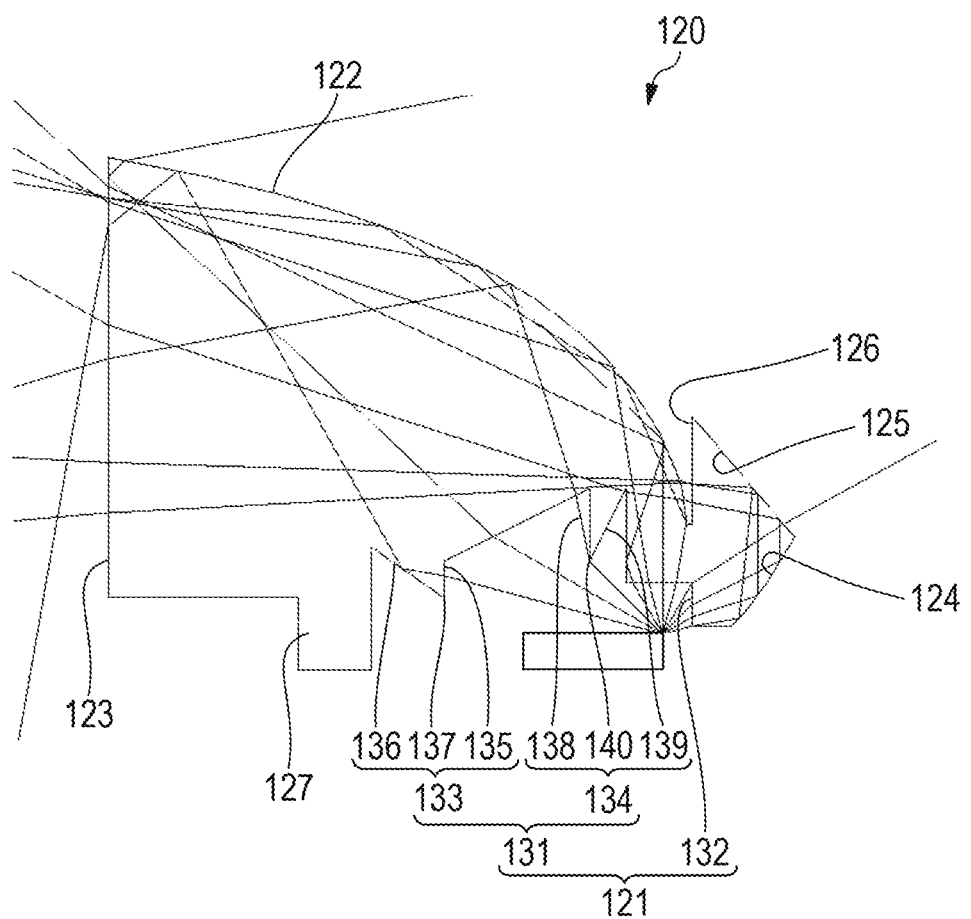
FIG. 6 illustrates light paths of light emitted from an inner end portion of the light-emitting element of the light flux controlling member according to Embodiment 1.
Figure 7:
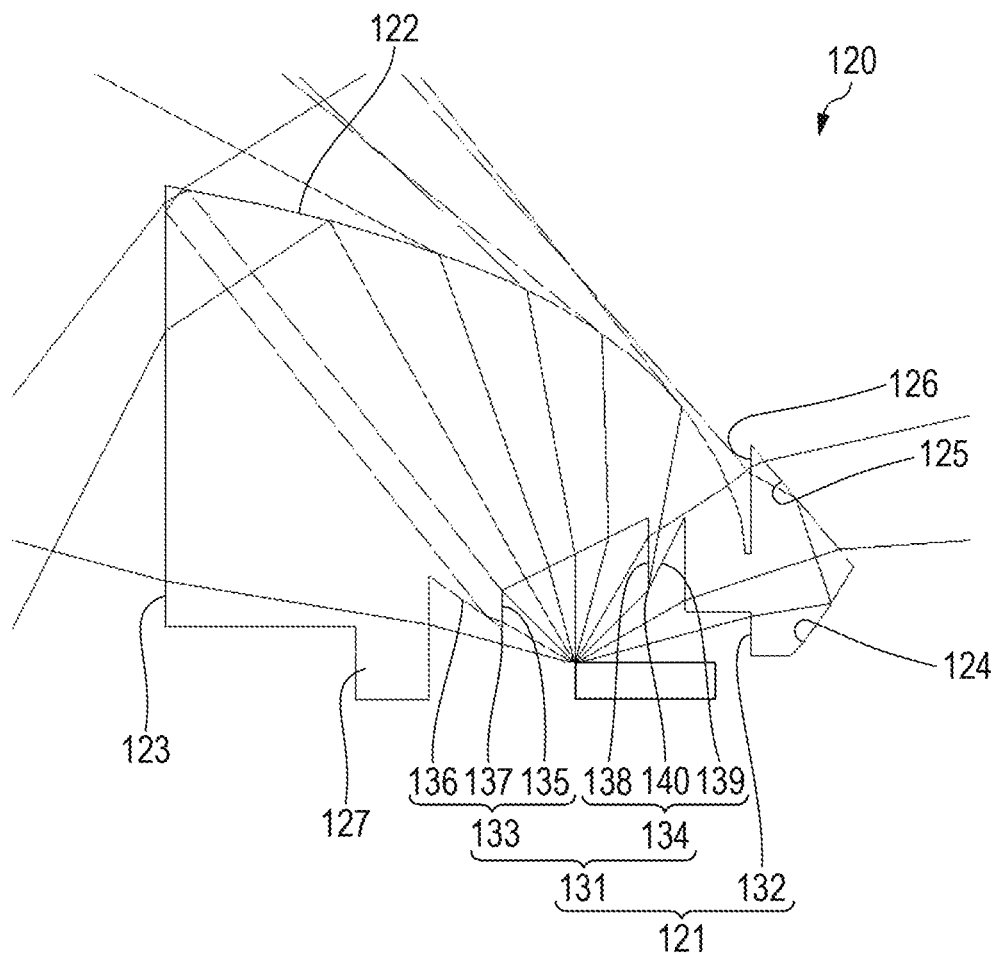
FIG. 7 illustrates light paths of light emitted from an outer end portion of the light-emitting element of the light flux controlling member according to Embodiment 1.

FIG. 5 to FIG. 7 are partially enlarged views illustrating light paths in light-emitting device 130. FIG. 5 to FIG. 7 illustrate light paths in the cross section including rotation axis RA. FIG. 5 illustrates light paths of light emitted from the center of light-emitting element 110. FIG. 6 illustrates light paths of light emitted from an inner end portion of light-emitting element 110. FIG. 7 illustrates light paths of light emitted from an outer end portion of light-emitting element 110. It is to be noted that, in FIG. 5 to FIG. 7, hatching of light flux controlling member 120 is omitted to illustrate light paths.

As illustrated in FIG. 5, light emitted from the center of light-emitting element 110 with a small emission angle to optical axis OA of light-emitting element 110 enters light flux controlling member 120 from the region between light first protrusion 133 and second protrusion 134, so as to be reflected by first total reflection surface 122, and thereafter emitted from emission surface 123. At this time, a large part of the light emitted from emission surface 123 is emitted rearward. In addition, light emitted from the center of light-emitting element 110 toward second incidence surface 132 side (rotation axis RA side) with a large emission angle to optical axes OA of light-emitting elements 110 enters light flux controlling member 120 from second incidence surface 132, so as to be reflected by second total reflection surface 124 and third total reflection surface 125 in this order. After emitted from connection surface 126, this light re-enters light flux controlling member 120 from first total reflection surface 122, and is then emitted from emission surface 123. Further, light emitted from the center of light-emitting element 110 toward first protrusion 133 side (outside) with a large emission angle to optical axes OA of light-emitting elements 110 enters light flux controlling member 120 from first inner inclined surface 135, and is then reflected by first outer inclined surface 136. Thereafter, this light is again internally reflected by first total reflection surface 122, and is then emitted from emission surface 123.

In addition, as illustrated in FIG. 6, light emitted from an end portion of light-emitting element 110 on rotation axis RA side toward second incidence surface 132 side (rotation axis RA side) with a large emission angle to optical axes OA of light-emitting elements 110 enters light flux controlling member 120 from second incidence surface 132, so as to be reflected by second total reflection surface 124 and third total reflection surface 125 in this order. After emitted from connection surface 126, this light re-enters light flux controlling member 120 from first total reflection surface 122, so as to be emitted from emission surface 123. On the other hand, light emitted from an end portion of light-emitting element 110 on rotation axis RA side toward first protrusion 133 side (outside) with a large emission angle to optical axes OA of light-emitting elements 110 enters light flux controlling member 120 from first incidence surface 131, so as to be reflected by first total reflection surface 122, and thereafter emitted from emission surface 123. At this time, a large part of the light emitted from emission surface 123 is emitted rearward.

As described above, first total reflection surface 122, second total reflection surface 124 and third total reflection surface 125 are designed such that light emitted from a region of light-emitting elements 110 on second incidence surface 132 side with respect to optical axes OA is easily totally reflected after entering light flux controlling member 120. Accordingly, as illustrated in FIG. 7, a part of light emitted from an outer end portion of light-emitting element 110 enters light flux controlling member 120 from first incidence surface 131 or second incidence surface 132, and reaches first total reflection surface 122, second total reflection surface 124 and third total reflection surface 125 through various paths so as to be emitted without being totally reflected. At this time, a large part of this emitted light is emitted in a direction away from rotation axis RA.

In addition, as illustrated in FIG. 5 to FIG. 7, a part of light which is emitted from light-emitting element 110 and is advanced inside light flux controlling member 120 so as to be emitted from emission surface 123 is emitted from emission surface 123 toward a lateral side (outside). In addition, a part of light emitted from light-emitting element 110 is emitted also from a portion other than light emission surface 123. To be more specific, a part of light emitted from light-emitting element 110 is emitted also from light first total reflection surface 122, second total reflection surface 124 and third total reflection surface 125. It is to be noted that, while light emitted from light-emitting element 110 is emitted also from second total reflection surface 124, such light is omitted in FIG. 5 to FIG. 7.

(Light Distribution Characteristics of Light-Emitting Device and Illumination Apparatus)

Next, to confirm the effect of flux controlling member 120 according to the present embodiment, the light distribution characteristics were simulated with light-emitting device 130 having 22 light-emitting elements 110 and light flux controlling member 120, and with illumination apparatus 100 in which cover 147 is attached to light-emitting device 130. To be more specific, with the intersection of rotation axis RA and a virtual plane including the light-emitting surfaces of 22 light-emitting elements 110 as the reference point, a relative illuminance in all directions in a plane including rotation axis RA was determined. In this simulation, the illuminance in a virtual plane distanced by 1,000 mm from the reference point was calculated. In addition, for comparison, the light distribution characteristics with only 22 light-emitting elements 110 were also simulated.

Figure 8:
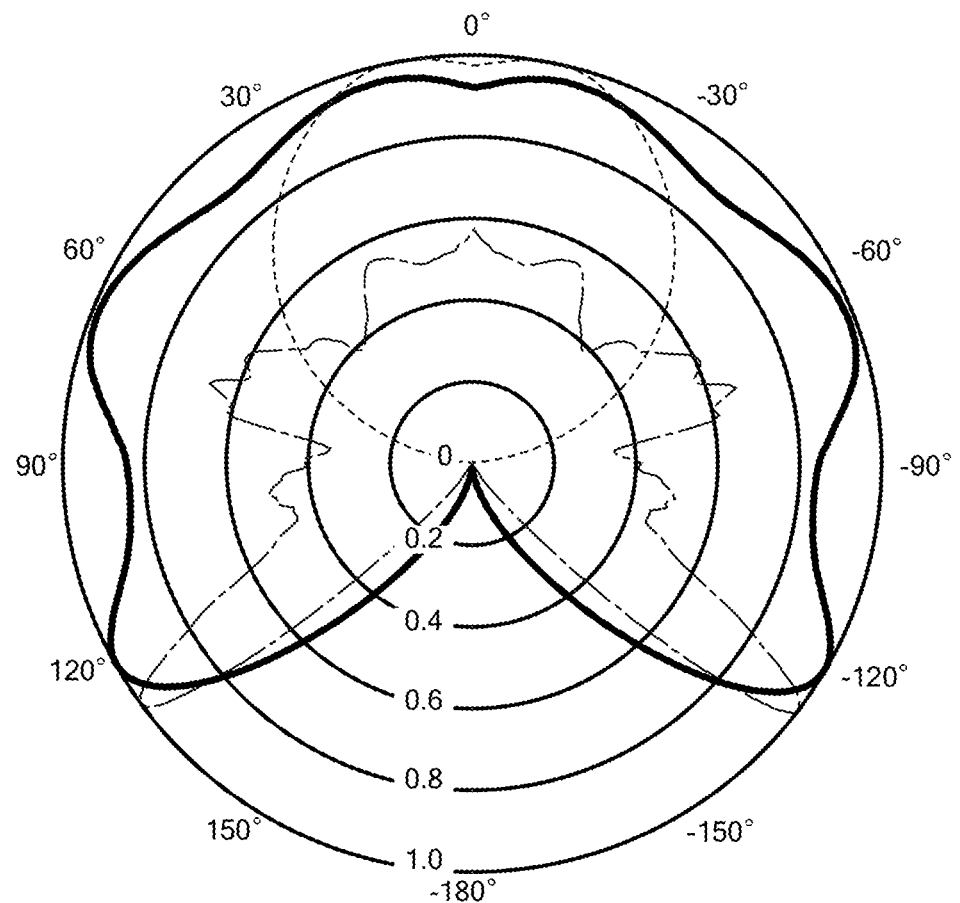
FIG. 8 is a graph illustrating light distribution characteristics of a light-emitting element, a light-emitting device and an illumination apparatus.

FIG. 8 is a graph illustrating light distribution characteristics of light-emitting element 110, light-emitting device 130 and illumination apparatus 100. The numerical values shown on the outside of the graph represent angles) (°) relative to the reference point. 0° represents the optical axis OA direction (forward direction), 90° the horizontal direction (lateral direction), and 180° the rearward direction. In addition, the numerical values shown on the inside of the graph represent the relative illuminances (maximum value: 1) of respective directions. In the graph, the dotted line indicates the result of the case when only light-emitting element 110 is used, and the dashed line indicates the result of the case where light-emitting element 110 and light flux controlling member 120 are combined (light-emitting device 130), and, the solid line indicates the result of the case where light-emitting element 110, light flux controlling member 120, and cover 147 are combined (illumination apparatus 100).

As illustrated in FIG. 8, it was confirmed that, in the case of light-emitting device 130 (dashed line), the light travelling in the direction of approximately ±120 was appropriately generated in addition to the light travelling forward. It was considered that, owing to second total reflection surface 124 and third total reflection surface 125 of light flux controlling member 120, light emitted from light-emitting element 110 to rotation axis RA (reference point) side can be appropriately directed rearward. That is, it was confirmed that light-emitting device 130 can reduce unevenness of the light by equalizing the quantity of the emitted light in the forward direction, the lateral direction and the rearward direction. In addition, it was confirmed that, in the case of illumination apparatus 100 in which cover 147 is attached to light-emitting device 130, unevenness of the light can be further reduced by equalizing the quantity of the emitted light in the forward direction, the lateral direction and the rearward direction.

(Effect)

As described above, illumination apparatus 100 including light flux controlling member 120 according to the present embodiment includes second total reflection surface 124 and third total reflection surface 125 for controlling light emitted from light-emitting element 110 to rotation axis RA side of light flux controlling member 120, and therefore illumination apparatus 100 can appropriately control the light emitted from light-emitting element 110 to rotation axis RA side of light flux controlling member 120 such that the light travels rearward. Accordingly, illumination apparatus 100 according to the present embodiment can provide light distribution characteristics yet closer to incandescent lamps in comparison with the conventional illumination apparatuses.

Embodiment 2

Next, illumination apparatus 200 according to Embodiment 2 is described. In Embodiment 2, an illumination apparatus which can be used in place of fluorescent lamps is described as a typical example of the illumination apparatus of the embodiment of the present invention.

(Configuration of Illumination Apparatus)

Figure 9A:
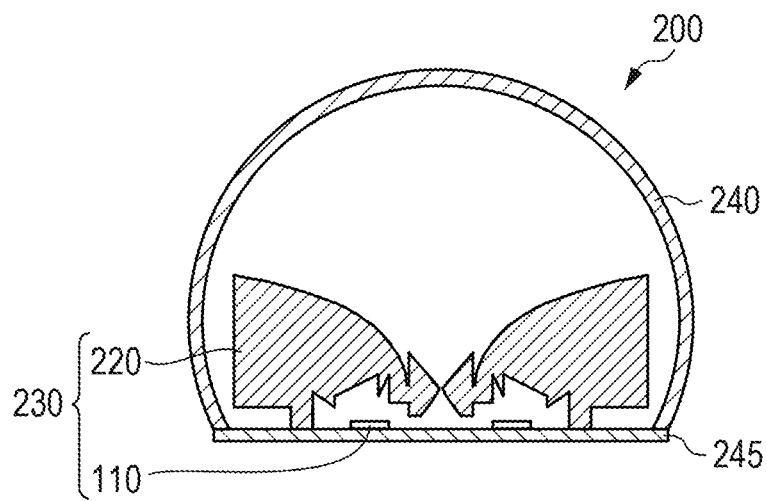
FIG. 9A and FIG. 9B illustrate an illumination apparatus according to Embodiment 2.
Figure 9B:
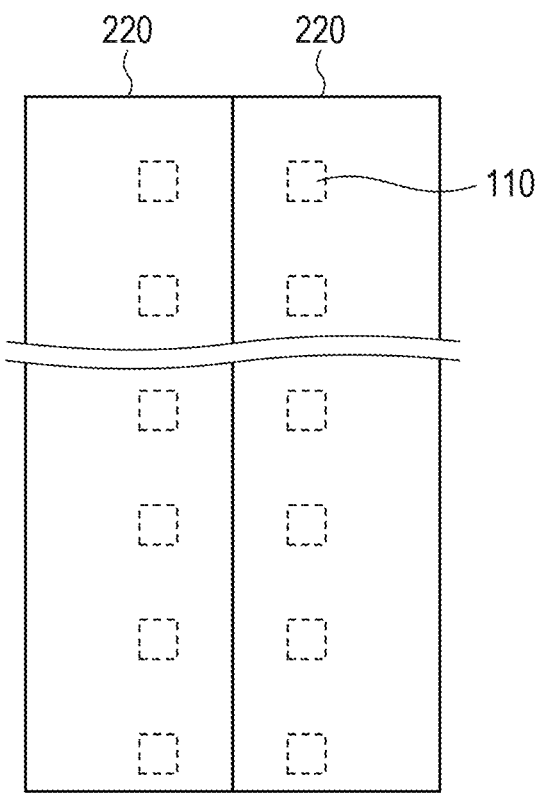
Figure 10A:
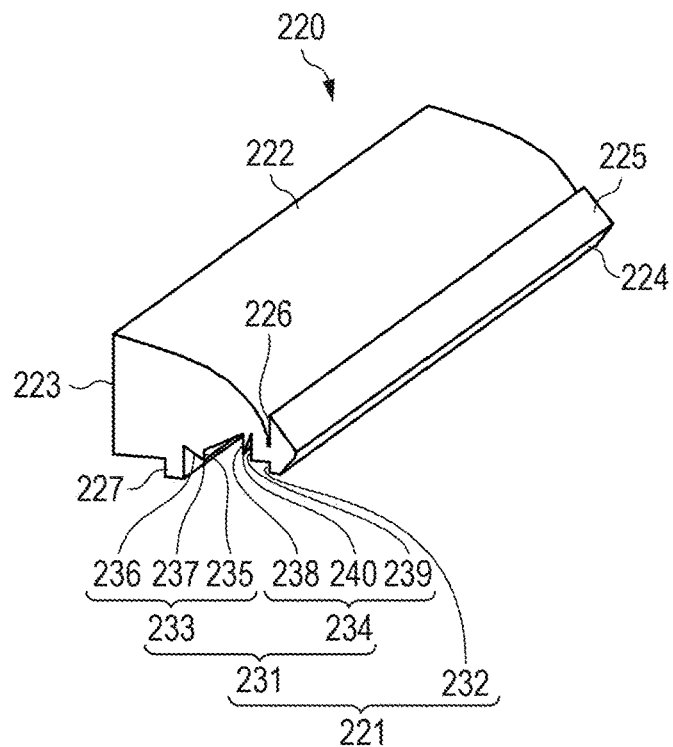
FIG. 10A and FIG. 10B illustrate a configuration of a light flux controlling member according to Embodiment 2.
Figure 10B:
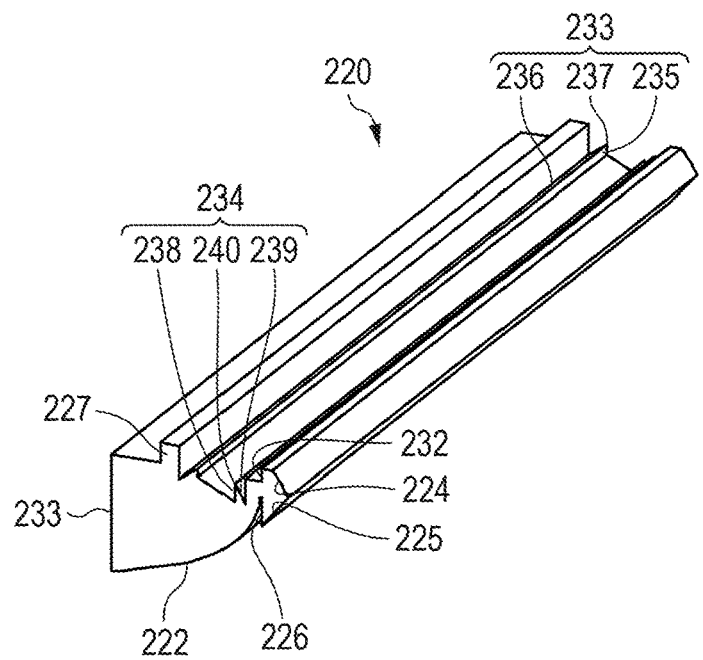

FIG. 9A and FIG. 9B illustrate a configuration of illumination apparatus 200 according to Embodiment 2 of the present invention. FIG. 9A is a sectional view of illumination apparatus 200, and FIG. 9B is a drawing (plan view) for describing a layout of light-emitting element 110. FIG. 10A and FIG. 10B illustrate a configuration of light flux controlling member 220 according to Embodiment 2. FIG. 10A is a perspective view of light flux controlling member 220 as viewed from cover 247 side, and FIG. 10B is a perspective view of light flux controlling member 220 as viewed from substrate 245 side.

As illustrated in FIG. 9A and FIG. 9B, illumination apparatus 200 includes two light-emitting devices 230, substrate 245, and cover 247. Each of two light-emitting devices 230 includes a plurality of light-emitting elements 110, light flux controlling member 220, and leg part 227.

Light-emitting element 110 is identical to that of illumination apparatus 100 according to Embodiment 1. In each light-emitting device 230, light-emitting elements 110 are disposed in a line on substrate 245. The number of light-emitting elements 110 in one light-emitting device 230 is not limited as long as two or more light-emitting elements 110 are provided. In the present embodiment, the number of light-emitting elements 110 is eleven. Light flux controlling member 220 is formed in a columnar shape. Two light-emitting devices 230 are disposed on substrate 245 such that second total reflection surfaces 224 and third total reflection surfaces 225 of light flux controlling members 220 are opposed to each other. It is to be noted that light flux controlling member 220 is described later.

The light emitted from light flux controlling member 220 is transmitted through cover 247 to the outside while being diffused by cover 247. Cover 247 is disposed to cover all light-emitting devices 230 with the air layer between cover 247 and light-emitting devices 230. The external surface of cover 247 serves as an effective light emission region. The shape of cover 247 is not limited as long as it can cover light-emitting devices 230 with the air layer therebetween. While cover 247 has a cylindrical form that is partially cut out in the example illustrated in FIG. 9A, cover 247 may have a cylindrical form or the like.

As illustrated in FIG. 10A and FIG. 10B, light flux controlling member 220 according to Embodiment 2 is formed in a columnar shape. Light flux controlling member 220 includes incidence region 221, first total reflection surface 222, emission surface 223, second total reflection surface 224, third total reflection surface 225 and connection surface 226. Incidence region 221, first total reflection surface 222, emission surface 223, second total reflection surface 224, third total reflection surface 225 and connection surface 226 extend in a direction (the arrangement direction of light-emitting elements 110) orthogonal to the direction along optical axes OA of light-emitting elements 110, and to one direction orthogonal to optical axis OA (more specifically, the direction that connects emission surface 223, and second total reflection surface 224 and third total reflection surface 225). Accordingly, each surface has no curvature in the above-mentioned direction (the arrangement direction of light-emitting elements 110).

Incidence region 221 is disposed to face light-emitting elements 110. Incidence region 221 includes first incidence surface 231 and second incidence surface 232. First incidence surface 231 includes first protrusion 233 including first inner inclined surface 235, first outer inclined surface 236 and first ridgeline 237, and second protrusion 234 including second outer inclined surface 238, second inner inclined surface 239 and second ridgeline 240.

The cross-sectional shapes of incidence region 221, first total reflection surface 222, emission surface 223, second total reflection surface 224, third total reflection surface 225 and connection surface 226 in the minor axis direction are identical to the cross sections on one side including rotation axis RA of light flux controlling member 120 of Embodiment 1. In addition, functions of incidence region 221, first total reflection surface 222, emission surface 223, second total reflection surface 224, third total reflection surface 225 and connection surface 226 are identical to incidence region 121, first total reflection surface 122, emission surface 123, second total reflection surface 124, third total reflection surface 125 and connection surface 126 of light flux controlling member 120 of Embodiment 1, respectively.

(Effect)

As described above, light flux controlling member 220 according to Embodiment 2 has an effect similar to that of light flux controlling member 120 according to Embodiment 1. In comparison with conventional illumination apparatuses, illumination apparatus 200 according to the present embodiment can provide light distribution characteristics yet closer to fluorescent lamps.

This application is entitled to and claims the benefit of Japanese Patent Application No. 2015-113054 filed on Jun. 3, 2015, the disclosure each of which including the specification, drawings and abstract is incorporated herein by reference in its entirety

INDUSTRIAL APPLICABILITY

The illumination apparatus of the embodiments of the present invention can be used in place of incandescent lamps or fluorescent lamps, and therefore can be widely applied to various kinds of illumination apparatuses such as chandeliers, or fluorescent lamps, and indirect lighting apparatuses.

REFERENCE SIGNS LIST 10, 50 Light flux controlling member
20 Bottom surface
21 Support surface
22, 60 Incidence surface
23, 61 First incidence surface
24, 62 Second incidence surface
25 Third incidence surface
30 First side surface
31 First projecting surface
32 First reflecting surface
40 Second side surface
41 Second projecting surface
42 Second reflecting surface
70 Projecting surface
71 First projecting surface
72 Second projecting surface
80 Total internal reflection surface
100, 200 Illumination apparatus
110 Light-emitting element
120, 220 Light flux controlling member
121, 221 Incidence region
122, 222 First total reflection surface
123, 223 Emission surface
124, 224 Second total reflection surface
125, 225 Third total reflection surface
126, 226 Connection surface
127, 227 Leg part
130, 230 Light-emitting device
131, 231 First incidence surface
132, 232 Second incidence surface
133, 233 First protrusion 134, 234 Second protrusion
135, 235 First inner inclined surface
136, 236 First outer inclined surface
137, 237 First ridgeline
138, 238 Second outer inclined surface
139, 239 Second inner inclined surface
140, 240 Second ridgeline
145, 245 Substrate
147, 247 Cover
150 Casing
151 Base
152 Tapered surface
153 Annular end surface
154 Protruding part
OA Optical axis
RA Rotation axis

The invention claimed is:

1. A light flux controlling member configured to control a distribution of light emitted from a light-emitting element, the light flux controlling member comprising:
    an incidence region configured to face the light-emitting element;
    a first total reflection surface disposed on a side opposite to the incidence region;
    an emission surface disposed in one direction orthogonal to an optical axis of the light-emitting element;
    a second total reflection surface disposed on a side opposite to the emission surface in the one direction;
    a third total reflection surface disposed on a side opposite to the second total reflection surface in a direction along the optical axis; and
    a connection surface connecting the first total reflection surface and the third total reflection surface, wherein
    a part of the light emitted from the light-emitting element enters the light flux controlling member from the incidence region so as to be reflected by the first total reflection surface before being emitted from the emission surface, and
    another part of the light emitted from the light-emitting element enters the light flux controlling member from the incidence region so as to be reflected by the second total reflection surface and the third total reflection surface in this order, and thereafter emitted from the connection surface so as to re-enter the light flux controlling member from the first total reflection surface before being emitted from the emission surface.

2. The light flux controlling member according to claim 1, wherein the incidence region includes:
    a first incidence surface configured to face the light-emitting element, the first incidence surface being configured to allow incidence of the light emitted from the light-emitting element such that at least light emitted from the light-emitting element with a small emission angle to the optical axis is allowed to be incident on the first incidence surface; and
    a second incidence surface disposed on the second total reflection surface side relative to the first incidence surface in the one direction, the second incidence surface being configured to allow incidence of light emitted from the light-emitting element toward the second total reflection surface side.

3. The light flux controlling member according to claim 2, wherein the second incidence surface is disposed along the optical axis.

4. The light flux controlling member according to claim 2, wherein the first incidence surface includes:
    a first protrusion disposed between the optical axis and the emission surface, the first protrusion being configured to allow incidence of a part of light emitted from the light-emitting element toward the emission surface, and then reflect, toward the first total reflection surface, the part of light emitted from the light-emitting element toward the emission surface; and
    a second protrusion disposed on the second incidence surface side relative to the first protrusion in the one direction, the second protrusion being configured to mainly allow incidence of a part of light emitted from an end portion of the light-emitting element on the emission surface side, and then reflect, toward the first total reflection surface, the part of light emitted from the end portion of the light-emitting element on the emission surface side.

5. The light flux controlling member according to claim 1, wherein:
    the first total reflection surface is formed such that an inclination of a tangent thereto gradually decreases toward the emission surface;
    the second total reflection surface is formed such that as a distance of the second total reflection surface from the third total reflection surface decreases, a distance of the second total reflection surface from the emission surface increases; and
    the third total reflection surface is formed such that as a distance of the third total reflection surface from the second total reflection surface decreases, a distance of the third total reflection surface from the emission surface increases.

6. The light flux controlling member according to claim 1, wherein the connection surface and the emission surface are disposed in the direction along the optical axis.

7. The light flux controlling member according to claim 1, wherein the incidence region, the first total reflection surface, the emission surface, the second total reflection surface, the third total reflection surface and the connection surface are rotationally symmetrical about a rotation axis extending along the optical axis, the rotation axis being disposed on the second total reflection surface side and the third total reflection surface side relative to the optical axis at a position distanced from the optical axis in comparison with the second total reflection surface and the third total reflection surface.

8. The light flux controlling member according to claim 1, wherein the incidence region, the first total reflection surface, the emission surface, the second total reflection surface, the third total reflection surface and the connection surface extend in a direction orthogonal to the optical axis and the one direction.

9. A light-emitting device comprising:
    a plurality of light-emitting elements; and
    the light flux controlling member according to claim 1, wherein
    the light flux controlling member is disposed such that the incidence region faces the plurality of light-emitting elements.

10. An illumination apparatus comprising:
    the light-emitting device according to claim 9; and
    a cover configured to allow light emitted from the light-emitting device to pass therethrough while diffusing the light.

* * * * *